US009763159B2

United States Patent
Sang et al.

(10) Patent No.: US 9,763,159 B2
(45) Date of Patent: Sep. 12, 2017

(54) DYNAMIC ALGORITHMS FOR WLAN-CELLULAR PERFORMANCE ESTIMATION, ACCESS SELECTION, AND TRAFFIC OFFLOAD

(71) Applicant: MEDIATEK Singapore Pte. Ltd., Singapore (SG)

(72) Inventors: Aimin Justin Sang, San Diego, CA (US); Chao-Chin Chou, Taipei (TW); Li-Chun Ko, Taipei (TW); Chia-Hung Tsai, Hsinchu (TW); Yih-Shen Chen, Hsinchu County (TW)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/693,203

(22) Filed: Apr. 22, 2015

(65) Prior Publication Data
US 2015/0312831 A1     Oct. 29, 2015

Related U.S. Application Data

(60) Provisional application No. 61/983,091, filed on Apr. 23, 2014.

(51) Int. Cl.
*H04L 12/26* (2006.01)
*H04W 36/30* (2009.01)
(Continued)

(52) U.S. Cl.
CPC ........... *H04W 36/30* (2013.01); *H04W 24/08* (2013.01); *H04W 36/0083* (2013.01);
(Continued)

(58) Field of Classification Search
CPC ..... H04W 36/30; H04W 24/08; H04W 36/22; H04W 84/12; H04W 36/0083
(Continued)

(56) References Cited

U.S. PATENT DOCUMENTS

| 9,413,676 B2 * | 8/2016 | Bandyopadhyay ... H04L 47/522 |
| 2003/0142651 A1 | 7/2003 | Matta et al. ................. 370/338 |

(Continued)

FOREIGN PATENT DOCUMENTS

| CN | 103038651 A | 5/2010 |
| CN | 103563451 A | 5/2011 |

(Continued)

OTHER PUBLICATIONS

International Search Report and Written Opinion of International Search Authority for PCT/CN2015/077291 dated Jul. 17, 2015(10 pages).
(Continued)

*Primary Examiner* — Sai-Ming Chan
(74) *Attorney, Agent, or Firm* — Imperium Patent Works; Zheng Jin; Helen Mao (57) ABSTRACT

Methods and apparatus are provided to measure, estimate throughput of wireless network for traffic offload. In one novel aspect, the UE determines the association status of a radio access network (RAN). The UE measures or estimates the end-to-end throughput of the RAN. In one embodiment, non-intrusive estimation by QoS probing request is used. In another embodiment, direct measurement with modeling is used. The modeling uses admission control/scheduling. In another embodiment, estimation or probing the metrics with or without modeling is used with either in-band probing or non-intrusive probing. In yet another embodiment, the throughput is obtained based on network signaling messages. In another novel aspect, the UE selects a dynamic measurement or estimation algorithm based on the association status and the QoS type of the traffic. Admission control procedure or binary admission procedure is used with the initial bandwidth request based on association status.

19 Claims, 8 Drawing Sheets

(51) Int. Cl.
*H04W 24/08* (2009.01)
*H04W 36/00* (2009.01)
*H04W 36/22* (2009.01)
*H04W 84/12* (2009.01)
*H04W 48/14* (2009.01)
*H04W 36/14* (2009.01)
*H04W 48/20* (2009.01)

(52) U.S. Cl.
CPC ............ *H04W 36/14* (2013.01); *H04W 36/22* (2013.01); *H04W 48/14* (2013.01); *H04W 48/20* (2013.01); *H04W 84/12* (2013.01)

(58) Field of Classification Search
USPC .......................................................... 370/236
See application file for complete search history.

(56) References Cited

U.S. PATENT DOCUMENTS

| | | | |
|---|---|---|---|
| 2004/0202180 A1 | 10/2004 | Montes Linares | 370/395.2 |
| 2012/0077505 A1* | 3/2012 | Wietfeldt | H04W 72/02 455/450 |
| 2013/0288673 A1 | 10/2013 | Le | 455/434 |
| 2013/0308445 A1 | 11/2013 | Xiang | 370/230 |
| 2014/0029420 A1 | 1/2014 | Jeong | 370/229 |
| 2014/0213256 A1* | 7/2014 | Meylan | H04W 36/22 455/436 |
| 2014/0355428 A1* | 12/2014 | Smith | H04W 48/06 370/230 |
| 2015/0124601 A1 | 5/2015 | Li et al. | 370/230 |

FOREIGN PATENT DOCUMENTS

| | | |
|---|---|---|
| EP | 1467588 A2 | 4/2003 |
| WO | WO2011149533 A1 | 5/2010 |
| WO | WO2013170751 A1 | 5/2012 |
| WO | WO2013171365 A1 | 5/2012 |

OTHER PUBLICATIONS

EPO, Search Report for the EP patent application 15783814.5 dated Jan. 19, 2017 (7 pages).

* cited by examiner

DYNAMIC ALGORITHMS FOR WLAN-CELLULAR PERFORMANCE ESTIMATION, ACCESS SELECTION, AND TRAFFIC OFFLOAD

CROSS REFERENCE TO RELATED APPLICATIONS

This application claims priority under 35 U.S.C. §119 from U.S. Provisional Application No. 61/983,091, entitled, "DYNAMIC ALGORITHMS FOR WLAN-CELLULAR PERFORMANCE ESTIMATION, ACCESS SELECTION, AND TRAFFIC OFFLOAD" filed on Apr. 23, 2014; the subject matter of which is incorporated herein by reference.

TECHNICAL FIELD

The disclosed embodiments relate generally to wireless communication, and, more particularly, to dynamic algorithms for WLAN-CELLULAR performance estimation, access selection and traffic offload.

BACKGROUND

The exponential growth of mobile subscribers requires substantial increase of network capacity. However, the capacity of a given network access technology network is limited by the laws of physics. The current cellular network deployed, such as 3G, LTE, LTE-A, suffers from limited licensed spectrum availability restraining the potential capacity increase. Small cell technologies, such as Wi-Fi WLAN is ideally positioned to extend the current cellular network capacity. Wi-Fi appeals to many operators as a cost-effective mean of offloading large amounts of mobile data traffic especially indoor where most of the traffic is generated. Operators are already taking advantage of devices supporting Wi-Fi as a tool to meet capacity demands by letting the user offload manually its traffic on standalone networks. This first stage of Wi-Fi off-loading is often associated with a manual hotspot selection followed by cumbersome logging procedures.

With the development of dual mode mobility devices, the focus of WLAN-cellular offload has evolved from purely static, manual, unsecure offloading traffic from cellular (e.g., 3G WCDMA HSPA or 4G LTE) to WLAN at the collocated UE/STA, to dynamic, automatic, secure, and seamless offloading and interworking between WLAN passport HS2.0 STA-AP systems and LTE UE-RAN-EPC networks, yet with mobility and roaming support between HPLMN and VPLMN. Assume that collocated cellular UE and WLAN STA chipsets, on a smart phone device for example, can coexist harmoniously in different bands without interfering each other. Given the assumption, WLAN-cellular radio can be activated at the same time without much concern of cross-interference. Hence intelligence is needed at the device to automatically decide in real time when to turn on both radios, in what order and to what benefit (KPIs), and how to offload traffic in-between them or concurrently use the two radio for better user experience, e.g., to speed up throughput when downloading of the single webpage through two radio interfaces simultaneously, or video streaming by one and voice telephony calling by another.

SUMMARY

Methods and apparatus are provided to dynamically measure and estimate throughput of wireless network for traffic offload. In one novel aspect, the UE determines the association status of a radio access network (RAN). The UE dynamically measures or estimates the end-to-end throughput of the RAN. In one embodiment, the end-to-end throughput is per flow, per PDN, or per device. In one embodiment, device-centric method is used for end-to-end throughput estimation. In one embodiment, non-intrusive estimation by QoS probing request is used. In another embodiment, direct measurement with modeling is used. The modeling uses admission control and scheduling. In another embodiment, estimation or probing the metrics with or without modeling is used with either intrusive in-band probing or non-intrusive probing. In yet another embodiment, the throughput is obtained based on network signaling messages. In one embodiment, device-network hybrid method is used. Additional network-device signaling is used to enable modeling, such as admission control and scheduling. The network system signaling is also used to assist the device side measurement or estimation. In another embodiment, in-device cross-layer measurements and estimations are used.

In another novel aspect, the UE selects a dynamic measurement or estimation algorithm based on the association status and the QoS type of the traffic. A hierarchical estimation algorithm is used. In one embodiment, four categories of methods are used. The first category is used when the UE is associated with a first access network and the traffic is a QoS traffic. The second category is used when the UE is not associated with any access network and the traffic is a QoS traffic. The third category is used when the UE is associated with a first access network and the traffic is a non-QoS traffic. The fourth category is used when the UE is not associated with any access network and the traffic is a non-QoS traffic. Admission control procedure is used as a non-intrusive probing procedure to estimate the throughput. In one embodiment, binary probing procedure is used with the initial bandwidth request based on association status.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
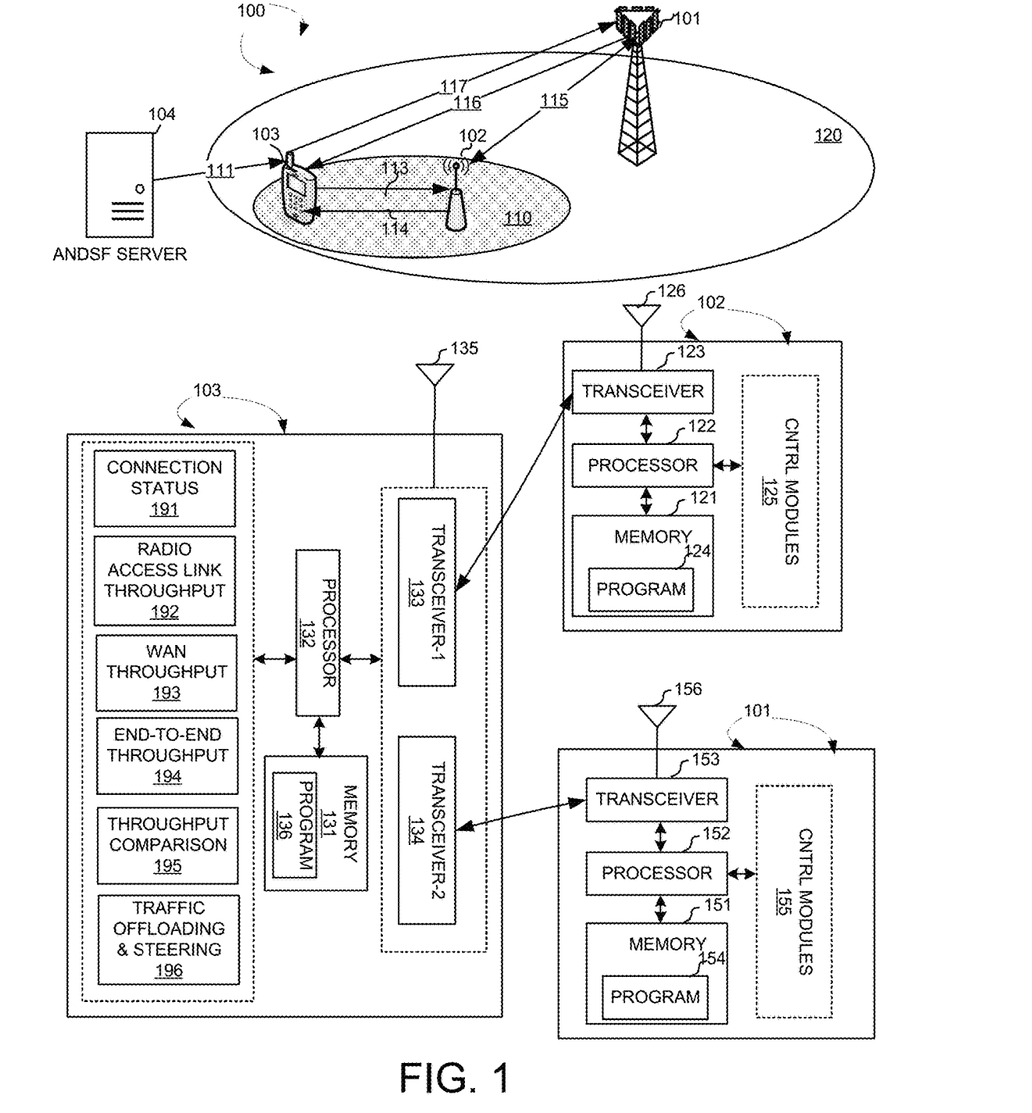
FIG. 1 is an exemplary block diagram illustrating a schematic diagram of a wireless communications system in accordance with embodiments of the present invention.

FIG. 1 is an exemplary block diagram illustrating a schematic diagram of a wireless communications system 100 in accordance with embodiments of the present invention. Wireless communications system 100 includes one or more fixed base infrastructure units 101 and 102, forming one or more access networks 110 and 120 distributed over a geographical region. The access network 120 and 110 may be a Universal Terrestrial Radio Access Network (UTRAN) in the WCDMA technology, an E-UTRAN in the Long Term Evolution (LTE)/LTE-A technology, a WiFi WLAN or other wireless communication system. The base unit may also be referred to an access point, base station, Node-B, eNode-B, or other terminologies used in the art. In some systems, one or more base stations are communicably coupled to a controller forming an access network that is communicably coupled to one or more core networks.

In FIG. 1, a mobile station 103 is connected wirelessly to base stations 101 and 102 for wireless service within a serving area, for example, a cell or within a cell sector. The mobile station may also be called as user equipment (UE), a wireless communication device, terminal or some other terminologies. Mobile station 103 sends uplink data to base stations 101 via uplink channel 117 in the time and/or frequency domain and receives signal from base station 101 via down link 116. Mobile station 103 also sends uplink data to base stations 102 via uplink channel 113 in the time and/or frequency domain. The serving base stations 101 and 102 transmit downlink signals via a downlink channel 116 and 114 to mobile station 103, respectively. Base station 101 and base station 102 are connected via backhaul connection 115. Mobile station 101 also connects with an access network discovery and selection function (ANDSF) unit 104. ANDSF 104 is an entity within an evolved packet core (EPC) of the system architecture evolution (SAE) for 3GPP compliant mobile networks. The purpose of the ANDSF is to assist mobile stations to discover non-3GPP access networks, such as Wi-Fi or WIMAX, which can be used for data communications in addition to 3GPP access networks and to provide the mobile stations with rules policing the connection to these networks.

FIG. 1 further shows simplified block diagrams of base station 101 and 102 in accordance to the current invention. Base station 101 has an antenna 155, which transmits and receives radio signals. A RF transceiver module 153, coupled with the antenna, receives RF signals from antenna 155, converts them to baseband signals and sends them to processor 152. RF transceiver 153 also converts received baseband signals from processor 152, converts them to RF signals, and sends out to antenna 155. Processor 152 processes the received baseband signals and invokes different functional modules to perform features in base station 101. Memory 151 stores program instructions and data 154 to control the operations of base station 101. A control module 155 carries out functions to enable cellular WLAN offload functions in accordance with the current invention.

Similarly, Base station 102 has an antenna 125, which transmits and receives radio signals. A RF transceiver module 123, coupled with the antenna, receives RF signals from antenna 125, converts them to baseband signals and sends them to processor 122. RF transceiver 123 also converts received baseband signals from processor 122, converts them to RF signals, and sends out to antenna 125. Processor 122 processes the received baseband signals and invokes different functional modules to perform features in base station 102. Memory 121 stores program instructions and data 124 to control the operations of base station 102. A control module 125 carries out functions to enable cellular WLAN offload functions in accordance with the current invention.

FIG. 1 also shows a simplified block diagram of mobile station 103 in accordance to the current invention. Mobile station 103 has an antenna 135, which transmits and receives radio signals. An RF transceiver module 133, coupled with the antenna, receives RF signals from antenna 135, converts them to baseband signals, and sends them to processor 132. RF transceiver 133, communicating with base station 102, also converts received baseband signals from processor 132, converts them to RF signals, and sends out to antenna 135. A second RF transceiver module 134, coupled with the antenna, receives RF signals from antenna 135, converts them to baseband signals, and sends them to processor 132. RF transceiver 134, communicating with base station 101, also converts received baseband signals from processor 132, converts them to RF signals, and sends out to antenna 135. Processor 132 processes the received baseband signals and invokes different functional modules to perform features in mobile station 103. Memory 131 stores program instructions and data 136 to control the operations of mobile station 103.

Mobile station 103 includes several modules that carry out different tasks in accordance with embodiments of the current invention. In one novel aspect, mobile station 103 carries the throughput measurement, estimation, and traffic offloading dynamically. The dynamic methods perform the measurement, estimation, and decision-making based on the real time inputs instead of following statically defined steps. For example, different measurement methods are dynamically used based on the conditions detected at the time of the measurement is performed. Similarly, different estimation methods are dynamically chosen from time to time when the condition of the mobile station changes. The traffic offloading and traffic steering are performed differently from time to time based on the detected conditions. In contrast to static methods such as periodical measurement and estimations, dynamic methods require more processing in real time such that the performance can be better adjusted according to the changing conditions.

A connection status module 191 determines connection status for each corresponding radio access link. A radio-access-link throughput module 192 dynamically determines corresponding radio access throughput for at least one of the first and the second radio access link based on the corresponding connection status. Radio access-link throughput module 192 dynamically measures radio access throughput if the UE is connected with corresponding radio access link. Otherwise, Radio access-link throughput module 192 dynamically estimates the radio access throughput. A wide area network (WAN) throughput module 193 dynamically estimates at least one WAN throughput for the first and the second radio access network. An end-to-end throughput module 194 determines at least one end-to-end throughput for the first and the second radio access network based on the corresponding radio access throughput and WAN throughput. A throughput comparison module 195 compares estimated throughputs of the first and the second radio access network based on the association status and a QoS requirement for a traffic flow of the UE. A traffic offloading and steering module 196 offloads and steers traffic between the first and the second radio access link based on the dynamically obtained estimation and the throughput comparison.

To enhance system performance, WLAN-cellular integration is expected to support automatic access selection and dynamic traffic offload and steering, including traffic aggregation and traffic splitting. The goal of the integration is the balanced performance between user-side QoS differentiation and efficient access/backhaul system usage. Performance of the integration depends on real-time algorithms inside a WLAN-Cellular multi-mode device, which in turn depends on the completeness and accuracy of input parameters or measured dynamic metrics. In one novel aspect, the throughput of the radio access only is measured and/or estimated. The end-to-end throughput across the radio access lin and the backhaul links are also measured and/or estimated. The throughput measurements can be per access, per device or per flow/packet data network (PDN).

Figure 2:
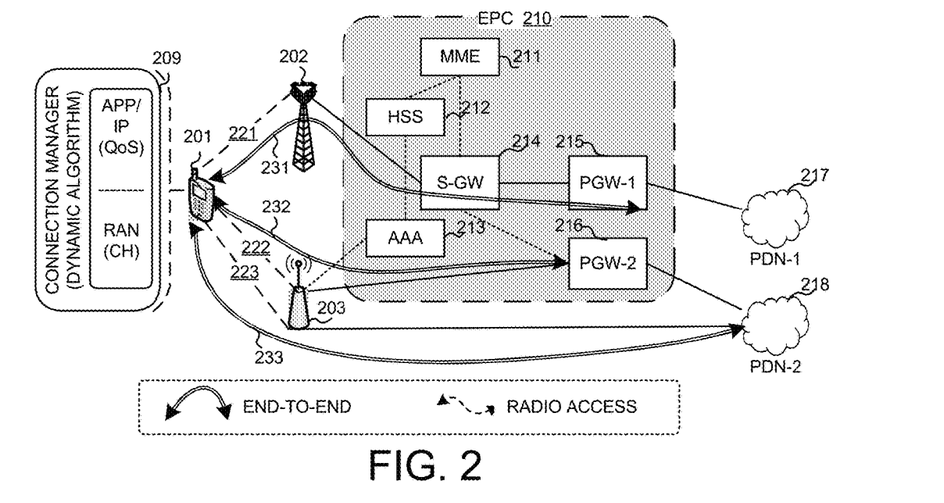
FIG. 2 illustrates an exemplary block diagram of measurements for radio-access-link throughput and end-to-end throughput for cellular WLAN traffic offload in accordance with embodiments of the current invention.

FIG. 2 illustrates an exemplary block diagram of measurements for radio-access-link throughput and end-to-end throughput for cellular WLAN traffic offload in accordance with embodiments of the current invention. A UE 201 is capable of connecting to a cellular eNB 202 and a WLAN base station 203. Base stations 202 and 203 are connected with an evolved packet core (EPC) 210 to PDN-1 217 and PDN-2 218, respectively. EPC 210 includes a mobility management entity (MME) 211, a home subscribe server (HSS) 212, an authentication authorization and accounting (AAA) 213, a serving gateway (SGW) 214. EPC 210 also includes a first packet gateway (PGW) PGW-1 and a PGW-2, which are connected with PDN-1 217 and PDN-2 218, respectively. UE 201 has a connection manager 209 that manages traffic offloading based on dynamic measurement and algorithm for traffic steering. The measurements including application and IP layer measurements, such as quality of service (QoS) and radio access network (RAN) layer measurements, such as channel quality.

As shown in FIG. 2, UE 201 can establish data traffic via link 231, which includes radio access link 221, links between eNB 202 and SGW 214, and links between SGW 214 and PGW-1. UE 201 can offload data traffic via two different offload paths, a link 232, which offers seamless WLAN offload path, and a link 233, which offers non-seamless WLAN offload path. Link 232 includes radio access link 222, links between eNB 203 and PGW-2. Link 233 includes radio access link 223, and a link to PDN-2 via the internet. The radio-link-access throughput of radio access link 221 between UE 201 and eNB 202 are measured or estimated dynamically based on measurement matrix. Similarly, the radio-link-access throughput of radio access links 222 and 223 between UE 201 and eNB 203 are measured or estimated dynamically based on measurement matrix. There are existing measurement matrixes for the radio-link-access. However, the end-to-end throughput is more important to reflect the condition of the links to enable better traffic offloading decisions. In one novel aspect, in addition to the throughputs of radio-link-access 221, 222 and/or 223, the end-to-end throughput of 231, 232, and/or 233 are measured or estimated by the UE. The UE estimates the uplink (UL) and downlink (DL) QoS or throughput based on measured channel quality (RSSI, RSRP, RSRQ) and device-network signaling. The end-to-end throughput is also based on the system loading, capacity and utilization status. In particular, the target parameters for the UE to dynamically estimate the throughputs includes:

UE DL radio channel quality RSSI and/or CINR,
UE power consumption for UL transmission or DL reception per bit to meet the MCS (FER/BER) requirements
UE latency requirements to deliver or receive a known amount of data in bytes, and to fill up the UL source allocation with sufficient data and/or padding
RAN/BSS's service latency accounting for
  sleep wakeup delay
  round-trip delay (with timing adjustment in RAN)
  contention access delay (RACH latency
  NAV/Congestion Window/DIFS or AIFS)
  the service constraints due to TDD UL/DL frame pattern and/or WLAN TXOP limit
RAN/BSS system load (in %)
eNB/AP measured (UL/DL) available resources such as leftover bandwidth, which is better normalized by service bandwidth request
end-to-end delay
backhaul system capacity, which is better normalized by service bandwidth request.
thermal condition of the device.

These parameters are either measured by the UE, obtained through system signaling or dynamically estimated by UE. These parameters are obtained dynamically by the UE. The UE dynamically estimate end-to-end throughput for different radio access links to make decision for traffic offloading.

Theoretically, depending on the availability of the parameters, there are different ways to determine the radio access throughput.

Radio_access_throughput
  $\approx$[wireless_link_speed*(1−utilization_level)*expected_time_share_by_scheduler],
    when wireless connection is establishment and active, and thus measurement of wireless_link_speed is feasible;
  $\approx$(CINR-to-MCS-mapping)/(user_number_in_the_system+1),
    when direct measurement of throughput is not feasible (e.g., device is not actively connected, i.e., not transmitting/receiving with the target system yet) but somehow it can learn its CINR and user_number_in_the_system; or
  $\approx$(e)NB or AP-estimated throughput (or load situation),
    when direct measurement is not feasible (e.g., device is not actively connected with the target system yet) but throughput/load can be advertised by eNB/AP based on standard (enhanced) explicit/implicit signaling; Or, ≈device-probed throughput (or load situation), when measurement is not feasible and there is no network-advertised throughput/load either.

Further, the dynamic estimation of end-to-end connections between the device and the remote peer or application server is:

End-to-end_throughput ≈min{Radio_access_throughput, WAN_throughput}.

where wireless_link_speed is user specific and related to the channel capacity based on device measured CINR;

expected_time_share_by_scheduler is better obtained from scheduler itself by signaling, but can also be estimated, say, by devices monitoring the resource allocation to other devices (e.g., TXOP in WLAN);

(1−utilization_level) refers to the leftover capacity after the higher-priority AC/QoS classes have been allocated resources or bandwidth to a specific utilization_level.

WAN_throughput≈[WAN_link_speed*(1−WAN_utilization_level)] is normally network-advertised or device-probed, particularly when measurements is not feasible (device is not connected with the target system yet).

user_number_in_the_system: may be difficult to estimate accurately by the device but still obtainable, say, by monitoring RTS/CTS/frames from other STAs/AP, or by monitoring un-decodable PDCCH grants to other UEs. It is better to be signaled by eNB/AP (with or without standard signaling enhancements).

Figure 3:
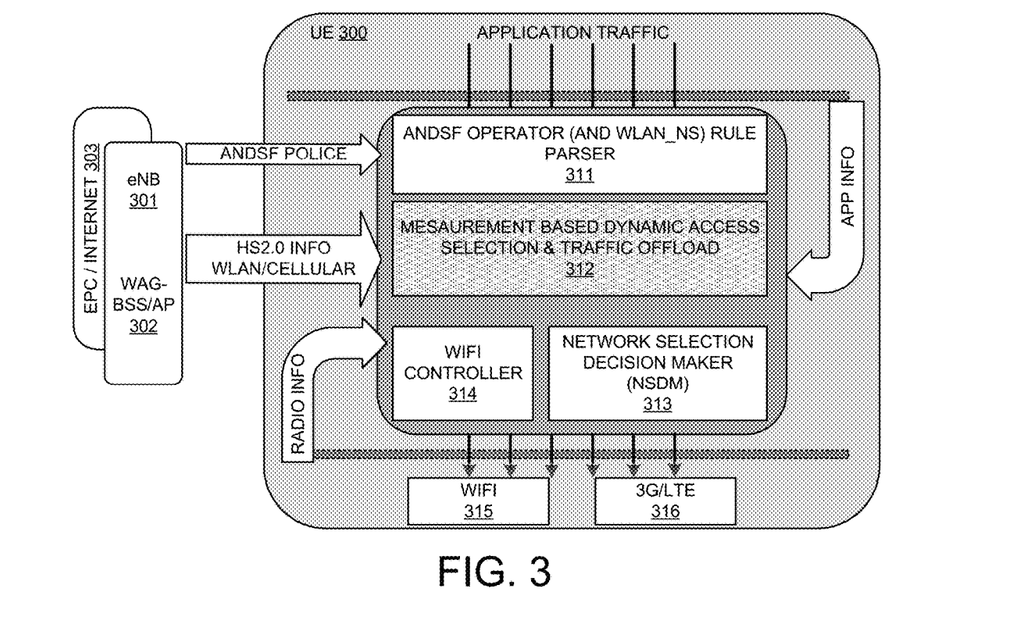
FIG. 3 shows an exemplary block diagram of the UE performing dynamic estimation, access selection, and traffic offloading based on measurements, estimation, and/or system signaling information.

FIG. 3 shows an exemplary block diagram of the UE performing dynamic estimation, access selection, and traffic offloading based on measurements, estimation, and/or system signaling information. An UE 300 has dual connectivity connecting to an eNB 301 and a wireless access gateway (WAG) 302. eNB 301 and WAG 302 connects with EPC and/or Internet 303. UE 300, with dual connectivity, transmits application traffic through a WiFi module 315 and/or a 3G/LTE module 316. The traffic-offloading algorithm is dynamically determined by UE 301 through different internal modules. An ANDSF operator and WLAN_NS rule parser 311 receives ANDSF policies and/or HS2.0 information from WLAN and/or cellular network. The ANDSF policies module 311 also parses the rules and policies from ANDSF, performs user/operator's rule matching against application/user QoS requirements, and checks current real-time channel conditions and system loading scenarios of different radio access network (RAN), scanning of channel quality regardless of association status, and throughput and channel quality estimation by modeling. UE 301 also includes a measurement based dynamic access selection and traffic offload module 312. Module 312 receives application information from the application layer of UE 301 and radio information from radio access layer of UE 301. Module 312 dynamically measures or estimates throughputs of different radio access network. A network selection decision-maker (NSDM) module 313 based on the measurement and/or estimation, Module 312 further dynamically makes access selection and/or traffic offloading decisions. A wifi controller 314 controls wifi module 315 for traffic offloading and traffic steering based on the decisions from the control modules of UE 301.

Figure 4:
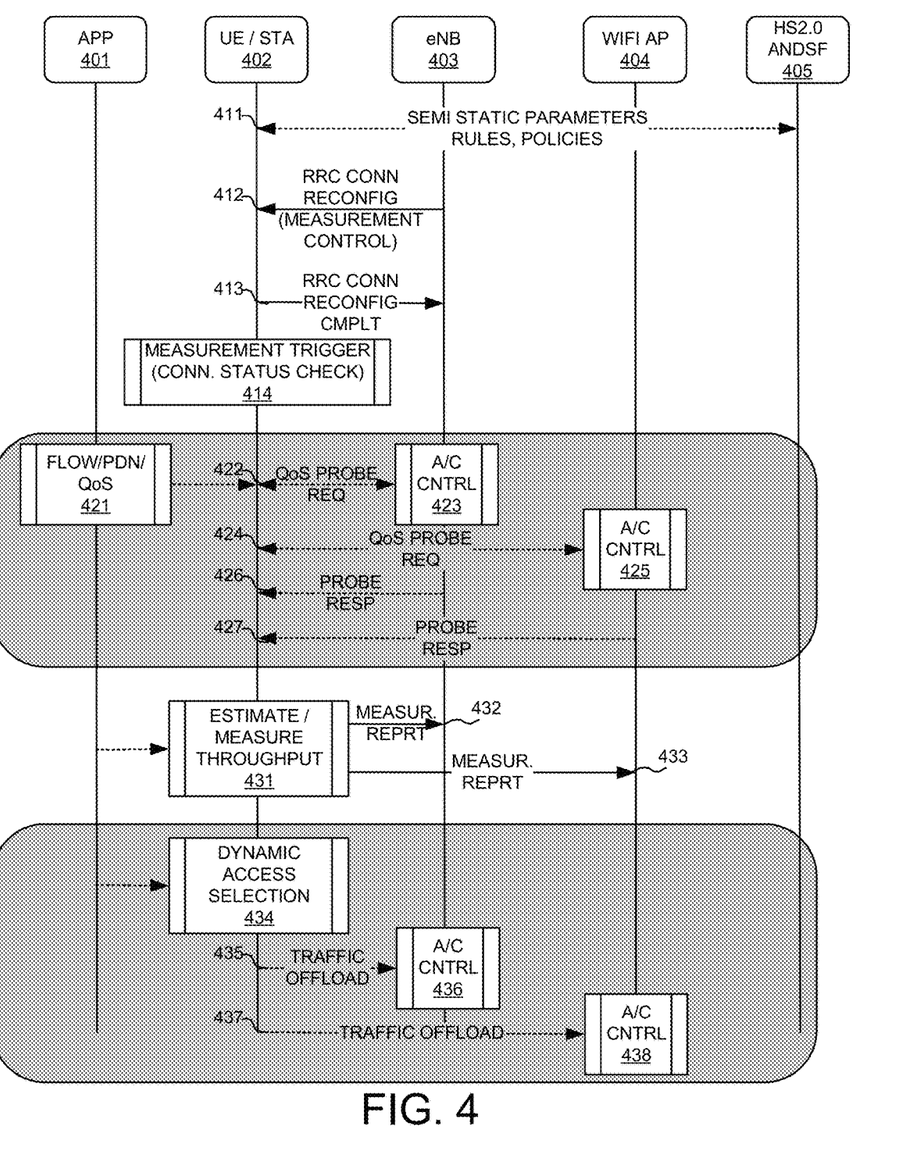
FIG. 4 is an exemplary flow chart for dynamic traffic offloading and/or traffic steering between the cellular network and the WLAN network in accordance with embodiments of the current invention.

FIG. 4 is an exemplary flow chart for dynamic traffic offloading and/or traffic steering between the cellular network and the WLAN network in accordance with embodiments of the current invention. A UE or STA 402 resides in the coverage area of an eNB 403 and a Wifi Access Point (AP) 404. UE 402 has an APP 401 that handles application traffic. A network entity 405, such as the ANDSF/HS2.0, is connected with eNB 403 and AP 404. At step 411, UE 402 receives semi static parameters, such as ANDSF/HS2.0 rules and policies from network entity 405. At step 412, eNB 403 sends RRC Connection Reconfiguration message with measurement control message to UE 402. At step 413, UE 402 replies with RRC connection Reconfiguration complete message. UE 402, at step 414, detects measurement triggers and checks connection status. At step 421, Application 401 checks QoS requirements per flow and/or per PDN and sends to UE 402.

In one novel aspect, non-intrusive probing is used to obtain the throughput estimates. Upon determines the QoS requirement from the application, UE 402 determines whether to perform traffic offload. In one novel aspect, UE 402 uses non-intrusive probing to estimate the throughput. In one embodiment, the non-intrusive probing uses admission control (A/C) procedures of the network as shown in FIG. 4. At step 422, UE 402 sends QoS probing request to eNB 403. The probing request uses the defined admission control procedure. UE 402 starts the admission control procedure based on the received QoS requirement. At step 423, eNB 403 processes the admission control request. UE 402, at step 424, also sends QoS probing request to Wifi AP 404. Wifi AP 404, at step 425, Wifi AP 404 processes the admission control request. At step 426, eNB 403 replies the probe request message with a probe response message, indicating whether the required throughput can be supported. Similarly, at step 427, Wifi AP 404 replies the probe request message with a probe response message, indicating whether the required throughput can be supported. Based on the probe responses, UE 402 determines throughput of the RAN. In one embodiment, as shown from steps 421 to 427, admission control procedures are used to perform the non-intrusive probing process. In one embodiment, since the resource request is used for probing purposes, UE 402 may release the required resource after receiving the responses. In other embodiments, UE 402 may determine to hold on to the resources requested during the probing procedure under certain conditions. For example, if UE 402 determines that the offloading is needed and feasible, UE 402 may use the allocated resource during the probing process for traffic offloading without releasing it. In other embodiment, the resources are released upon receiving the probe responses. UE 402 subsequently determines whether to offload the traffic and the bandwidth required for the offloading.

At step 431, UE 402 obtains measurement inputs, and estimates an end-to-end throughput. At step 432, UE 402 sends a measurement report message to eNB 403. At step 433, UE 402 sends a measurement report message to Wifi AP 404. At step 434, UE 402 made decision on dynamic RAN selection and traffic steering. At step 435, UE 402 starts traffic offloading process to eNB 403, who performs an admission control procedure at step 436. At step 437, UE 402 starts traffic offloading process to Wifi AP 404, who performs an admission control procedure at step 437. As illustrated above, the throughput estimation method is an important aspect. There are three main types of estimation approaches: the device-centric estimation approach, the device/network-hybrid estimation approach, and the Modem-system estimation approach.

The device-centric estimation approach includes direct measurement approach, the probing with modeling approach and the signaling with or without standard enhancements approach.

The direct measurement approach is used when device is actively connected to the target access system. This can be done purely in real-time, or done by combining a real-time self-learning/training with an offline-built empirical table lookup. The probing with modeling approach is used when the device is not actively connected to the target access system yet. It can be done non-intrusively or using in-band end-to-end probing. The signaling approach provides network assistance about the system load and/or expected throughput for the target device under device's request or not.

As adopted in the Estimation Algorithm, when measurements are not feasible (e.g., the device is not connected with the target system yet), the device has to probe the system in order to predict the performance or throughput. Such approaches include in-band end-to-end probing and a non-intrusive probing. The in-band end-to-end probing uses application-level ping (ICMP) or some duplex applications, which are normally not very accurate or protocol dependent. A flow of fixed/targeted source traffic rate can be used to probe both accesses, compare them, and find the one who delivers less packet loss, lower latency, and/or higher throughput in general. This is applicable to best-effort/non-QoS traffic flows. The non-intrusive probing such as man-made connection setup request and release request for RRC-layer at the RAN, and/or transport level (RSVP) resource reservation and teardown end-to-end. Normally (e)NB or QoS AP has a connection admission controller to decide whether it has enough (bandwidth) resource to meet the UE or QoS STA's connection request, or how much resource is available. The admission controller provides feedback indicating whether the resource or QoS request can be met, how much resource is granted, or what the acceptable resources are after several negotiation handshakes. For WLAN systems supporting QoS/802.11e, ADDTS and DELTS are used to indicate the User Priority (UP) that maps to one of the four ACs, and may trigger connection admission control and connection deletion. However, not all ACs requires admission control. Similarly, in LTE and/or EPC, the EPS bearer setup and QCI value for a specific service data flow indicates specific QoS and admission control level at the eNB. Not all QCI/QoS level requires admission control.

Further UE/STA can use binary partition probing algorithm with requested bandwidth and QoS (rate in kbps; delay in second) to probe (e)NB/AP until the request of bandwidth x is "barely" admitted. This value x can be considered the projected/predicted throughput of the associated system. Then based on the comparison between the two x's from WLAN and LTE, or x from one (the candidate) system and the historical throughput measurement from another (the associated) system, we can decide on the LTE-WLAN offload. If the decision is to stay with the already associated system, then a connection teardown request can be sent to be candidate system to revert the reserved resources from the previous admission request. The device-network hybrid approach combines the device-centric approach with a network-centric approach. The network centric approach uses network assisted signaling, for example the system load or throughput measurements, with or without device's signaling request. One example is the WLAN HS2.0 ANQP advertisement from the core networks to the device, regardless of device's connection status to the access systems; or any utilization/load information from the access systems (AP or eNB) when based on the network-side knowledge. Therefore, using the hybrid approach, the device can estimate the performance based on its measurement and the network-signaled system information, e.g., number of active users in the same access systems. The modem-system estimation approaches include three different layers: the PHY-layer, the MAC-layer and the Modem-system level throughput. The PHY-layer parameters include the raw physical-layer throughput derived from, e.g., LTE's CSI (CQI, RI, PMI) and suggested MCS level from TPC/Link Adaptation, or the RSSI/RCPI measurement and the 5-bit MCS level inside WiFi's PLCP header. Any other physical-layer specific factors such as transceiver performance and eICIC optimization (fractional power control/soft power control, etc.) should have been factored into the MCS level with the target PER/FER. The system load however is hard to be accurately obtained at PHY-layer alone. Therefore, the throughput only reflects the physical channel conditions similar to RSSI. The MAC-layer parameters reflects CSMA/CA access, frame aggregation, and multi-user contentions in the same BSS for WLAN systems; or cellular base station's scheduling (available or granted resources), HARQ, and loading situations within the single cell, in addition to the PHY layer factors. Note that in WLAN systems, the upper-limited TXOPs (as included in the 2-Byte DURATION field inside MAC header), i.e., the NAV, and the "BSS Load IE" information inside Beacon or Probe Response provides reservation (delay), STA population and traffic level inside a BSS. The Modem-system level throughput reflects not just MAC/PHY layers but also higher-layer protocols, such as LTE's ARQ, and application-level QoS requirements such as packet loss, delay/jitter, and/or reliability expectations. Also included are the acceptance ratio during connection setup due to the admission controller at (e)NB for LTE RRC-layer PDN bearer setup, or QoS AP considering 802.11e TSPEC, and/or service waiting time due to virtually sensed (NAV)/PSD in WLAN or DRX wakeup delay in LTE systems.

Figure 5:
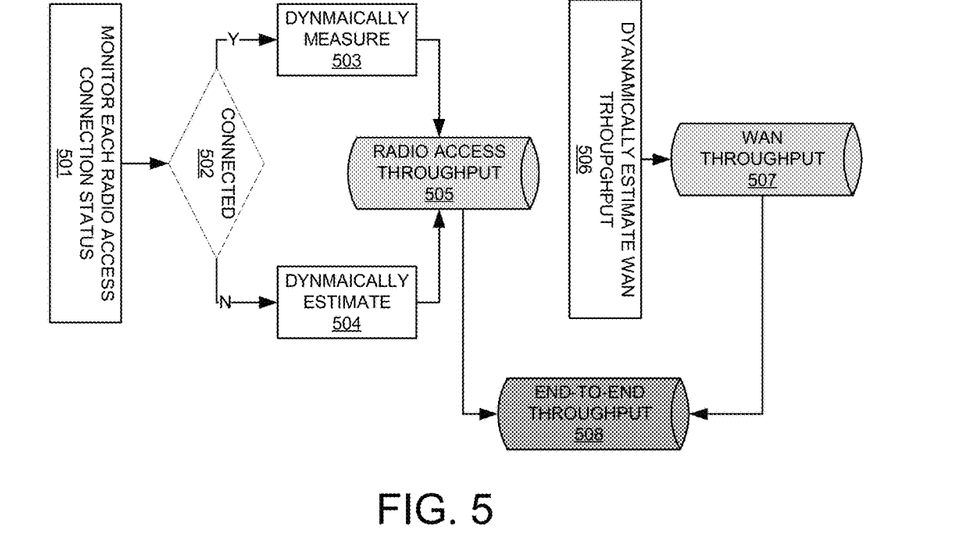
FIG. 5 illustrates exemplary flow charts for the UE to determine the end-to-end throughput in accordance with embodiments of the current invention.

FIG. 5 illustrates exemplary flow charts for the UE to determine the end-to-end throughput in accordance with embodiments of the current invention. At step 501, the UE monitors status of each radio access connection. At step 502, the UE determines if the UE is connected with the particular radio access network. If step 502 determines yes, the UE moves to step 503 and dynamically measures the throughput parameters. If step 502 determines no, the UE moves to step 504 and dynamically estimates the throughput parameters. After the UE either measures or estimates the throughput parameters, the UE moves to step 505 and determines radio access throughputs. To be more accurately making the traffic-offloading decision, end-to-end throughputs are needed. Therefore, at step 506, the UE dynamically estimates the WAN throughput parameters. At step 507, the UE determines the WAN throughput. At step 508, the UE determines the end-to-end throughput based on the radio access throughput and the WAN throughput.

Figure 6:
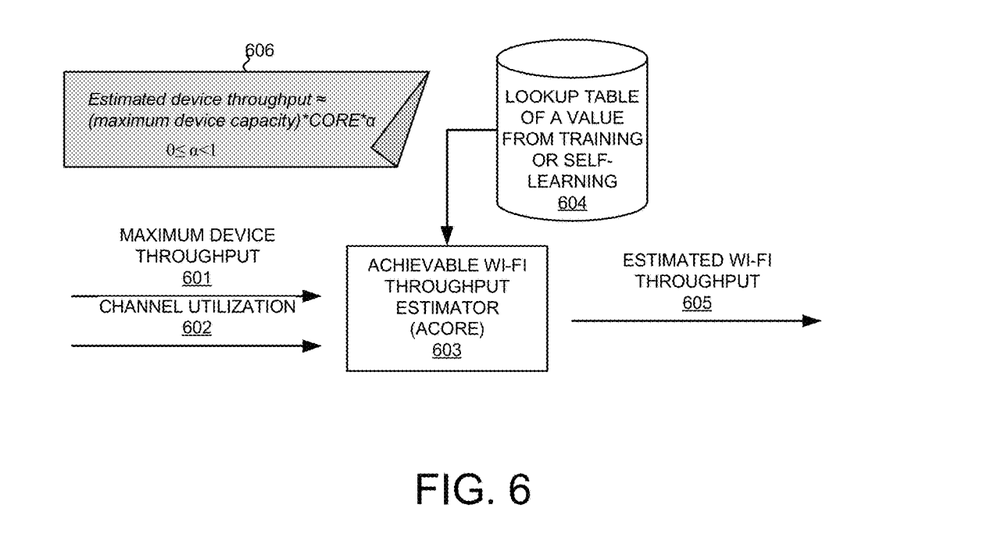
FIG. 6 shows an exemplary diagram of a direct throughput measurement by combining online self-adaption with offline empirical table lookup in accordance to embodiments of the current invention.

FIG. 6 shows an exemplary diagram of a direct throughput measurement by combining online self-adaption with offline empirical table lookup in accordance to embodiments of the current invention. At step 601, the UE obtains maximum device throughput. At step 602, the UE obtains channel utilization results. A lookup table 604 contains values from training or self-training data. The inputs of 601 and 602 are used as indexes to the lookup table. At step 603, an achievable Wifi throughput estimator with a constant of a estimates the throughput for the Wifi. At step 605, the UE obtains the estimated wifi throughput.

Note 606 illustrates a detailed formula in estimating the wifi throughput based the input parameters using the lookup table.

Estimated device throughput≈(maximum device capacity)*CORE*α where 0≤α<1 is calibrated using offline measurement (vs. the estimation) or self-adaptively online learned over time.
where CORE (Channel Occupancy Residual Estimation=CIR−(MAC-to-PHY) overhead;

CIR (Channel Idle Radio)=1−(BSS load);

In another novel aspect, the UE selects different ways to dynamically measure or estimate the end-to-end throughput. The UE selects different methods based on many factors, including the association status of the UE and the QoS requirements of the applications or flows.

Figure 7:
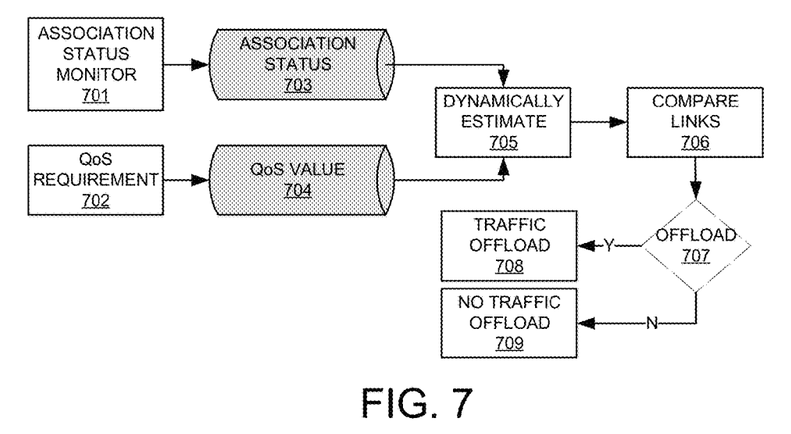
FIG. 7 shows an exemplary flow chart of the UE determining whether to offload the traffic based on the association status and QoS requirements in accordance with embodiments of the current invention.

FIG. 7 shows an exemplary flow chart of the UE determining whether to offload the traffic based on the association status and QoS requirements in accordance with embodiments of the current invention. At step 701, the UE monitors the association status of each radio access link. At step 703, the UE dynamically obtains the current association status for each radio access link. At step 702, the UE monitors the application and/or data flow's QoS requirements. At step 704, the UE obtains the QoS requirement value for the application/flow. At step 705, the UE dynamically estimates the throughput for each radio access network based on the association status and the QoS requirement value. At step 706, the UE compares the estimated throughputs for each radio access network. At step 707, the UE determines whether to perform traffic offload. If step 707 determines yes, the UE performs traffic offload to another radio access network at step 708. If step 707 determines no, the UE keeps the traffic load without offloading at step 709.

There are different methods available to estimate and/or measure the throughput for traffic offloading purpose. It is important for the UE to select an appropriate method based on different scenarios. Some of the conditions to consider in selecting the estimation or measuring method are the association status and the QoS type of the traffic.

Figure 8:
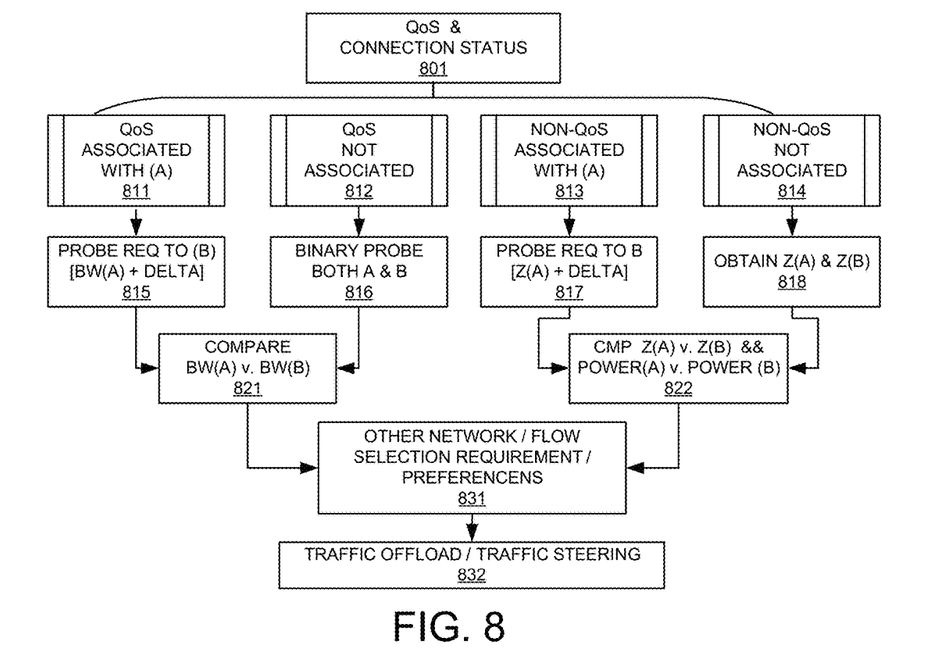
FIG. 8 shows an exemplary block diagram illustrating different categories of conditions and their corresponding method in throughput measurement and/or estimation in accordance to embodiments of the current invention.

FIG. 8 shows an exemplary block diagram illustrating different categories of conditions and their corresponding method in throughput measurement and/or estimation in accordance to embodiments of the current invention. At step 801, the UE checks the QoS type of the traffic and the connection status. Based on the real time determination of the QoS type and connection status, there are four possible categories, based on which the UE can select a measurement and/or estimation method. The four categories are: category 811, which indicates a QoS type traffic with UE associating with RAN A; category 812, which indicates a QoS type traffic with UE not associating with RAN A; category 813, which indicates a non-QoS type traffic with UE associating with RAN A; and category 814, which indicates a non-QoS type traffic with UE not associating with RAN A.

Based on the different categories, different dynamic measurement and/or estimation methods are adopted. If the UE is determined to be in category 811, the UE moves to step 815 for dynamic measurement. In this category, because the UE is associated with RAN A, the UE can directly measure the throughput of RAN A. Therefore, the UE sends non-intrusive probe message to estimate the throughput. The UE measures the throughput of Access A, BW(A). In one embodiment, an admission request is sent to RAN B. The initial value of BW(B)=BW(A)+delta. The requested bandwidth in the admission request is set to be the bandwidth of the RAN A (BW(A)), which is obtained by direct measurement, plus a Delta value. The bandwidth Delta value can be predefined or dynamically configured. Upon receiving an admission response from RAN B, the UE would know if the RAN B would be a better candidate to support the traffic flow.

If the is determined to be in category 812, the UE moves to step 816 for dynamic measurement. In this category, because UE is not associated with any RAN, the UE uses binary probing for both RAN A and RAN B. Using binary probing, the UE first sent a probing request, such as admission request, with an initial bandwidth. The value of the initial bandwidth can be determined based on the QoS requirement of the application, or a predefined or dynamically configured bandwidth. The initial value of the binary probe can be the minimum of bandwidth requirement of all flows or PDNs from their QoS requirement. If the first probing request were accepted, the UE would adjust the second requested bandwidth to a larger number, such as double the initial bandwidth. If the first probing request were rejected, the UE would adjust the second bandwidth request lower, such as lower to the half of the initial bandwidth request. The UE, thereby, send the second probing request with the second adjusted bandwidth. Similarly, depending the response for the second probe request, the UE adjust the third bandwidth according such that the third bandwidth is adjusted using the binary search method based on the previous bandwidth request. Using the binary probing method, the UE will eventual converge to a point that the requested bandwidth equals to or at least close to the throughput of the network. The UE then iterate the procedure for the second network RAN B. The UE thereby can get the real time throughputs for RAN A and RAN B.

Since category 811 and category 812 are both QoS traffic, the UE moves to step 821 after obtaining the allowable bandwidth for RAN A (BW(A)) and for RAN B (BW(B)). At step 821, the UE compares the BW(A) and BW(B). The UE then moves to step 831. At step 831, the UE considers the comparison results of BW(A) and BW(B) from step 821, together with other factors, such as other network or flow related requirements and preferences. Based on the decision from 831, the UE moves to step 832 to determine how to perform the traffic offload or traffic steering.

If the UE is determined to be in category 813, the UE moves to step 817 for dynamic measurement. In this category, because the UE is associated with RAN A, the UE can directly measure the throughput of RAN A. Therefore, the UE sends non-intrusive probe message to estimate the throughput. In one embodiment, an admission request is sent to RAN B. The requested bandwidth in the admission request is set to be the throughput of the RAN A (Z(A)) plus a Delta value. The bandwidth Delta value can be predefined or dynamically configured. Upon receiving an admission response from RAN B, the UE would know if the RAN B would be a better candidate to support the traffic flow. In this category, the throughput of Access A Z(A) is measured or modeled. The throughput of Access B Z(B) is measured or probed.

If the is determined to be in category 814, the UE moves to step 818 for dynamic measurement. Similar to step 816, in this category, because UE is not associated with any RAN, the UE may use binary probing for both RAN A and RAN B and obtain the throughput estimation for RAN A (Z(A))

and RAN B (Z(B)). In obtaining the throughput estimation, the UE can use probe, measure (such as scan) or estimation (such as modeling).

Since category 811 and category 812 are both non-QoS traffic, the UE moves to step 822 after obtaining the allowable throughput for RAN A (Z (A)) and for RAN B (Z(B)). At step 822, the UE compares the Z(A) and Z(B). The UE further compares the UE power consumption of POWER (A) and POWER (B). The UE then moves to step 831. At step 831, the UE considers the comparison results of Z(A) and Z(B), POWER (A) and POWER(B) from step 821, together with other factors, such as other network or flow related requirements and preferences. Based on the decision from 831, the UE moves to step 832 to determine how to perform the traffic offload or traffic steering.

The dynamic algorithm for traffic offloading mainly considers the RAN-level or Core Network-level dynamic parameters, such as channel quality, QoS performance, and/or resource availability, instead of operator-controlled static ANDSF policies, application scenarios, or user preferences by configuration. It runs in real time on the device at either modem-side processor or the application-processor, or at both with inter-processor communications. The dynamic algorithm incorporates in its flow the device-centric and/or device/network hybrid parameter estimation approaches, and the modem-system level estimation approach as well. Regardless of traffic requirements (QoS or non-QoS), a key point is whether the device is already associated with an access (A or B) or not. If the association is ready and active traffic is flowing between the device and the access network system, then the device can practically measure throughput, CINR, or power consumption, and compare the measurements with both access for decision-making. If the association is not ready or there is no active traffic yet between the device and the access system(s), then the device can only use probing or signaling approach to estimate the parameters.

Another key point in our dynamic algorithm is to differentiate the application PDNs/flows in terms of QoS requirements. QoS traffic is treated with higher priority than best-effort traffic. QoS traffic has associated QoS request parameters, e.g., minimum bandwidth or throughput expectation or delay constraint, thus incur admission control inside the network. For the QoS traffic that is not associated with network yet, and thus measurement is not doable, the device can use aforementioned "binary partition probing algorithm" to probe. Best-effort or non-QoS traffic does not incur QoS request-based admission control, and hence the access selection is better based on measurable or estimated throughput, CINR, and/or power consumption with either access, as perceived by the device.

Figure 9:
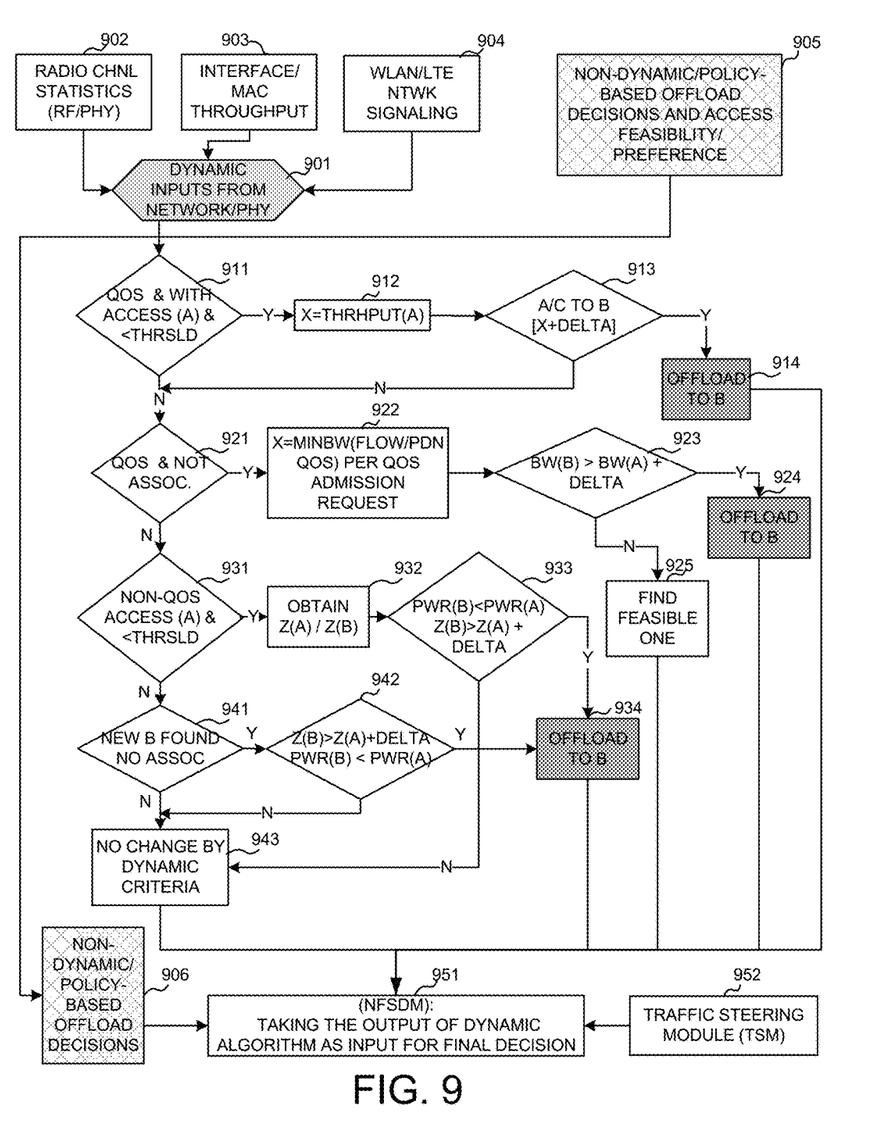
FIG. 9 illustrates a detailed flow chart for the dynamic offload and traffic steering algorithm in accordance with embodiments of the current invention.

FIG. 9 illustrates a detailed flow chart for the dynamic offload and traffic steering algorithm in accordance with embodiments of the current invention. It shows the algorithm flow of the dynamic LTE-WLAN offload and traffic steering based on the inputs of dynamically estimated information, and intermediate decisions from higher-priority decision criteria. Assume the candidate access systems are A or B, where A could be LTE and B be WiFi, or vice versa.

At step 901, the UE takes real time measurements dynamically from inputs of network or PHY. The inputs may include the radio channel statistics 902 from RF/PHY, the interface/MAC throughput 903, the WLAN/LTE network signaling measurement inputs 904. There are also other non-dynamic or static/semi-static policy inputs 905, such as policy-based offload decisions and access feasibility preferences. Non-dynamic inputs 905 are sent to step 906 to determine non-dynamic policy based offload decision.

The dynamic real time measurements are further processed to determine the end-to-end throughput and traffic offloading decisions. At step 911, the UE determines if the traffic is QoS traffic with association to access A, and the current performance is below a predefined threshold. If step 911 determines no, the UE moves to step 921 to determine which category it belongs. If step 911 determines yes, the UE further obtains the throughput of access A, which it is associated. The UE then moves to step 913 and initiates an admission control procedure to Access B. The initial bandwidth request sent to B equals to the throughput of Access A plus a delta. Step 913 then waits for the response for the admission control request. If Access B responses yes, which means Access B has throughput at least equals to throughput of A plus the delta. The UE then moves to step 914 and prepare traffic offloading to Access. If step 913 receives admission control denied, the UE moves to step 921.

The UE, at step 921, determines if the traffic is QoS traffic with no association with either access A or B, and the current performance is below a predefined threshold. If step 921 determines no, the UE moves to step 931 to determine which category it belongs. If step 921 determines yes, the UE further determines the minimum bandwidth X the UE needs for the application per flow/PDN according to the QoS requirement. The UE then moves to step 923 to determine if both Access A and Access B are allowed. If ye, the UE initiates an admission control procedure to Access A and Access B using binary probing request method. Upon obtaining the throughput estimate of Access A and B using the binary probe request process, Step 923 then determines if the throughput of B is larger than the throughput of A plus a delta. If step 923 determines yes, the UE then moves to step 924 and prepare traffic offloading to Access B. If step 924 determines no, the UE moves step 925 and find a feasible network for the traffic flow.

At step 931, the UE determines if the traffic is non-QoS traffic with association to access A, and the current performance is below a predefined threshold. If step 931 determines no, the UE moves to step 941 to determine which category it belongs. If step 931 determines yes, the UE moves to step 933 and further obtains the throughput of access A and Access B through non-intrusive probing, such as using the admission control process, or through system signaling messages. The UE then moves to step 933 and determines if throughput of Access B is greater than Access A plus a delta. Step 933 further determines if the power consumption of Access B is smaller than the power consumption of Access A. In one embodiment, step 933 determines yes if both conditions met, which means Z(B)>Z (A) and POWER (B)<POWER (A). In another embodiment, step 933 determines yes if one of the condition meets, which means Z(B)>Z(A) or POWER (B)<POWER (A). If step 933 determines yes, the UE moves step 934 and performs traffic offloading to Access B. If step 933 determines no, the UE moves step 941.

The UE, at step 941, determines if the traffic is non-QoS traffic with no association with either access A or B, and the current performance is below a predefined threshold. If step 941 determines no, the UE moves to step 943 and determines that there is no change by the dynamic criteria. If step 941 determines yes, the UE initiates non-intrusive probing process, such as admission control process to determine the throughput of Access A and Access B. Upon obtaining the throughput estimate of Access A and B using dynamic estimation such as the binary probe request process, Step 942 then determines if the throughput of B is larger than the throughput of A plus a delta and the power consumption of Access B is smaller than Access A. In one embodiment, step 942 determines yes if both conditions met, which means Z(B)>Z(A) and POWER (B)<POWER (A). In another embodiment, step 942 determines yes if one of the condition meets, which means Z(B)>Z(A) or POWER (B)<POWER (A). If step 942 determines yes, the UE then moves to step 934 and prepare traffic offloading to Access B. If step 942 determines no, the UE moves to step 943 and determines that there is no change by the dynamic criteria.

At step 951, the network/flow selection decision maker (NFSDM) taking the input of the dynamic algorithm as input for the final decision. The decision is sent to traffic steering module (TSM) 952 to perform the determined traffic offloading and/or traffic steering.

Figure 10:
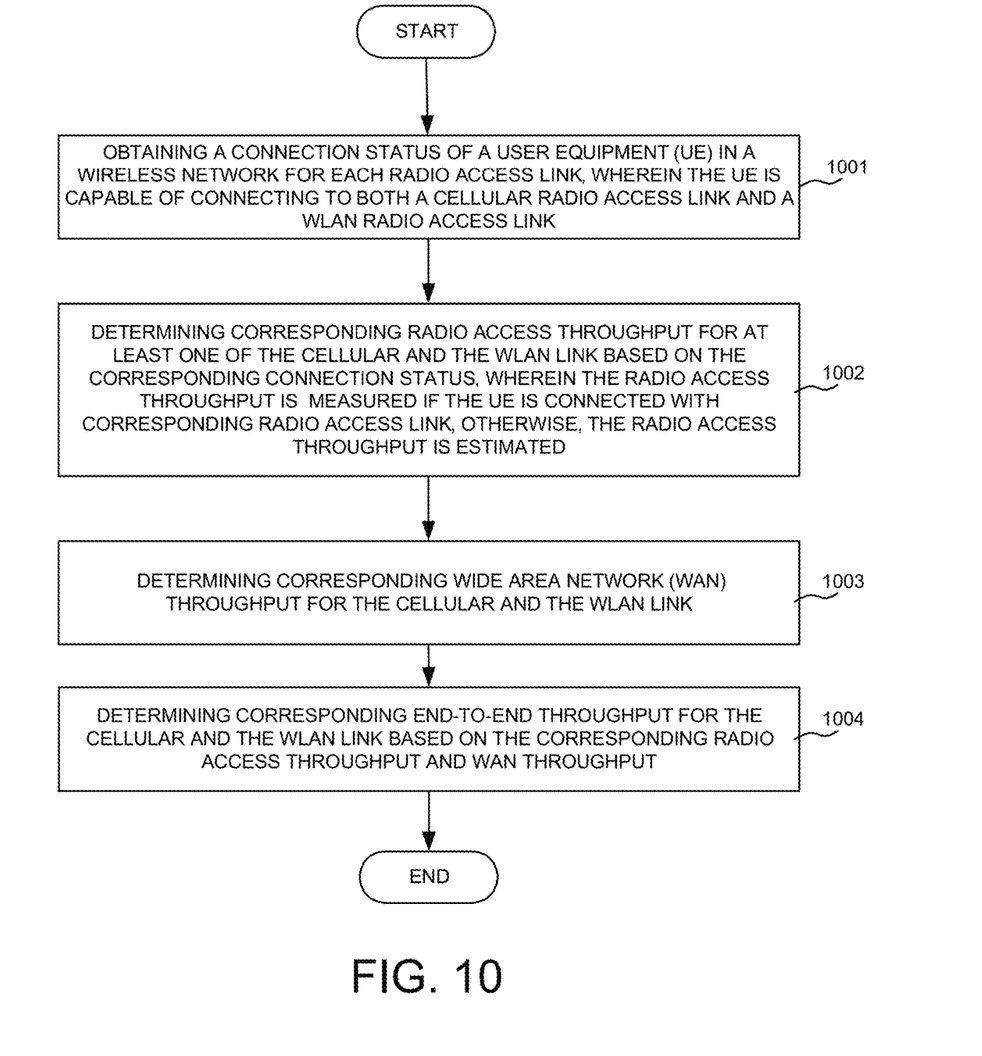
FIG. 10 shows an exemplary flow chart of the UE dynamically measuring and/or estimating a throughput in accordance with embodiments of the current invention.

FIG. 10 shows an exemplary flow chart of the UE dynamically measuring and/or estimating a throughput in accordance with embodiments of the current invention. At step 1001, the UE obtains a connection status of a UE in a wireless network for each radio access link, wherein the UE is capable of connecting to both a cellular radio access link and a WLAN radio access link. At step 1002, the UE determines corresponding radio access throughput for at least one of the cellular and the WLAN link based on the corresponding connection status, wherein the radio access throughput is measured if the UE is connected with corresponding radio access link. Otherwise, the radio access throughput is estimated. At step 1003, the UE determines corresponding wide area network (WAN) throughput for the cellular and the WLAN link. At step 1004, the UE determines corresponding end-to-end throughput for the cellular and the WLAN link based on the corresponding radio access throughput and WAN throughput.

Figure 11:
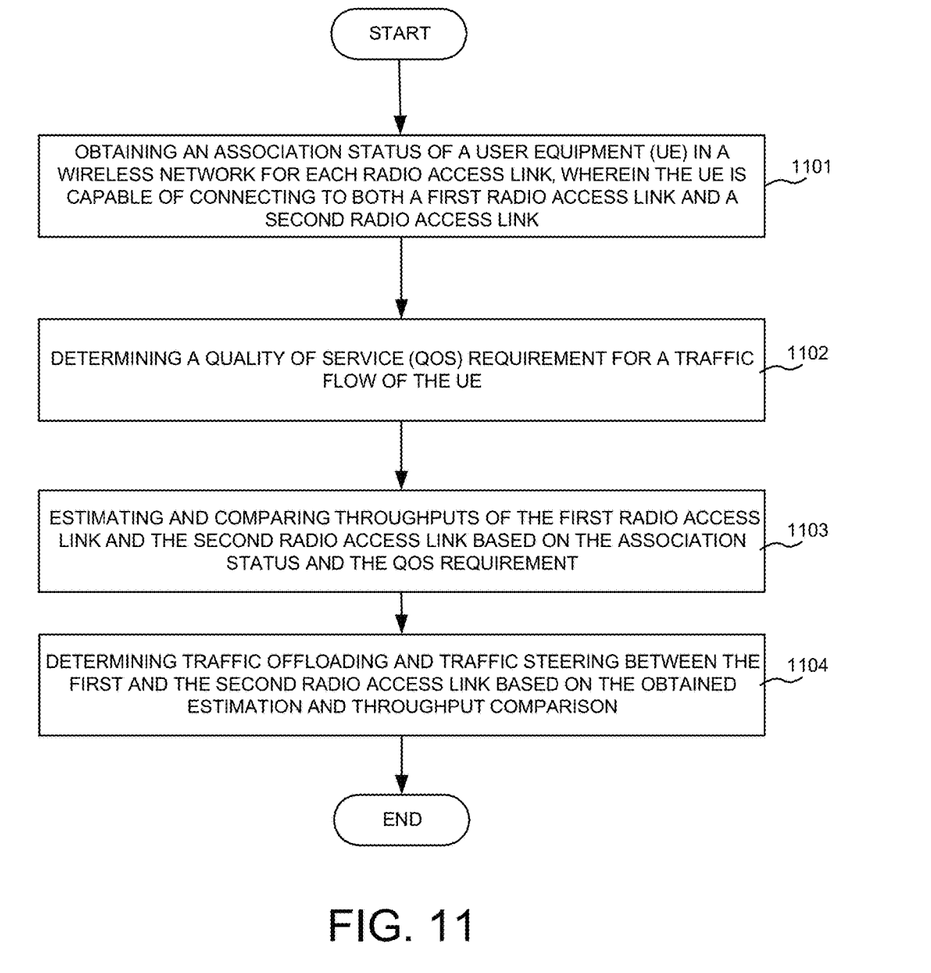
FIG. 11 shows an exemplary flow chart of the UE dynamically accesses and determines the traffic offloading and/or traffic steering procedure in accordance with embodiment of the current invention.

FIG. 11 shows an exemplary flow chart of the UE accesses and determines the traffic offloading and/or traffic steering procedure in accordance with embodiment of the current invention. At step 1101, the UE obtains an association status of a UE) in a wireless network for each radio access link, wherein the UE is capable of connecting to both a first radio access link and a second radio access link. At step 1102, the UE determines a quality of service (QoS) requirement for a traffic flow of the UE. At step 1103, the UE estimates and compares throughputs of the first radio access link and the second radio access link based on the association status and the QoS requirement. At step 1104, the UE determines traffic offloading and traffic steering between the first and the second radio access link based on the obtained estimation and throughput comparison.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   obtaining a connection status of a user equipment (UE) in a wireless network for each radio access link, wherein the UE is capable of connecting to both a cellular radio access link and a WLAN radio access link;
   determining corresponding radio access throughput for at least one of the cellular and the WLAN link based on the corresponding connection status, wherein the radio access throughput is measured if the UE is connected with corresponding radio access link, otherwise, the radio access throughput is estimated, and wherein the measuring the radio access throughput involves: measuring a channel utilization, estimating a device throughput based on the measured channel utilization level and measurements of MAC-to-PHY overheads, and obtaining the throughput by looking up a throughput estimator table indexed by the channel utilization and the estimated device throughput;
   determining corresponding wide area network (WAN) throughput for the cellular and the WLAN link; and
   determining corresponding end-to-end throughput for the cellular and the WLAN link based on the corresponding radio access throughput and WAN throughput.

2. The method of claim 1, wherein the estimating of the radio access throughput uses probing based on a traffic characteristics, wherein an in-band end-to-end probing is used if the traffic characteristics is a best-effort or non-QoS traffic, otherwise, a non-intrusive probing is used such that no in-band probing traffic is needed for the estimation.

3. The method of claim 2, wherein the non-intrusive probing is done using binary search.

4. The method of claim 2, wherein non-intrusive probing uses an admission control procedure to estimate the radio access throughput by requesting a desired bandwidth from the network.

5. The method of claim 1, wherein the estimating of the radio access throughput uses an admission control procedure with an estimated initial bandwidth and QoS request for a probing purpose.

6. The method of claim 5, wherein a binary partition is used to generate new bandwidth request for subsequent admission control procedures such that a maximum allowed bandwidth is reached.

7. The method of claim 1, wherein the estimating of the radio access throughput is based on system load information received from the wireless network.

8. The method of claim 1, wherein the end-to-end throughput is determined for at least one of a defined estimation level comprising: a device level throughput, a traffic flow level throughput, an access level throughput and a PDN level throughput.

9. A method comprising:
   obtaining an association status of a user equipment (UE) in a wireless network for each radio access link, wherein the UE is capable of connecting to both a first radio access link and a second radio access link;
   determining a quality of service (QoS) requirement for a traffic flow of the UE; and
   estimating and comparing throughputs of the first radio access link and the second radio access link based on the association status and the QoS requirement; and
   determining traffic offloading and traffic steering between the first and the second radio access link based on the obtained estimation and throughput comparison, wherein the traffic offloading and traffic steering are hieratically structured such that higher QoS traffic flows are considered for offloading before lower QoS traffic flows, and wherein the estimation and the comparison of throughputs of the first and the second radio access link are performed iteratively for each traffic flow of the UE, and wherein estimated parameters are updated for each iteration.

10. The method of claim 9 wherein the determination of traffic offloading and traffic steering are further based on one or more system information comprising: a user preference, an application QoS, application scenarios, and network operation policies.

11. A user equipment (UE) comprising:
a first transceiver that transmits and receives radio signals via a first radio access link;
a second transceiver that transmits and receives radio signals via a second radio access link;
a connection status module that determines corresponding connection status for each radio access link; and
a radio access link throughput module that determines corresponding radio access throughput for at least one of the first and the second radio access link based on the corresponding connection status, wherein the radio access throughput is measured if the UE is connected with corresponding radio access link, otherwise, the radio access throughput is estimated, and wherein the radio access link throughput module estimates the radio access throughput uses an admission control procedure with an estimated initial bandwidth and QoS request for a probing purpose.

12. The UE of claim 11, wherein the radio access link throughput module estimates the radio access throughput uses probing based on a traffic characteristics, wherein an in-band end-to-end probing is used if the traffic characteristics is a best-effort or non-QoS traffic, otherwise, a non-intrusive probing is used such that no in-band probing traffic is needed for the probing.

13. The UE of claim 11, wherein a binary partition is used to generate new bandwidth request for subsequent admission control procedures such that a maximum allowed bandwidth is reached.

14. The UE of claim 11, further comprising:
a wide area network (WAN) throughput module that estimates at least one WAN throughput for the first and the second radio access network; and
an end-to-end throughput module that determines at least one end-to-end throughput for the first and the second radio access network based on the corresponding radio access throughput and WAN throughput.

15. The UE of claim 14, wherein the end-to-end throughput is determined for at least one of a defined estimation level comprising: a device level throughput, a traffic flow level throughput, an access level, and a PDN level throughput.

16. The UE of claim 11, further comprising:
a throughput comparison module that compares estimated throughputs of the first and the second radio access network based on the association status and a QoS requirement for a traffic flow of the UE; and
a traffic offloading and steering module that offloads and steers traffic between the first and the second radio access link based on the obtained estimation and the throughput comparison.

17. The UE of claim 16, wherein the traffic offloading is hieratically structured such that higher QoS traffic flows are considered for offloading before lower QoS traffic flows.

18. The UE of claim 16, wherein the estimation and the comparison of throughputs of the first and the second radio access link are performed iteratively for each traffic flow of the UE, and wherein estimated parameters are updated for each iteration.

19. The UE of claim 16, wherein the determination of traffic offloading is further based on one or more system information comprising: a user preference, an application QoS, application scenarios, and network operation policies.

* * * * *